United States Patent
Stephens et al.

(10) Patent No.: US 6,575,867 B1
(45) Date of Patent: Jun. 10, 2003

(54) THREE-SPEED TRANSFER CASE

(75) Inventors: Carl Stephens, Liverpool, NY (US); Thomas Noble, Liverpool, NY (US)

(73) Assignee: New Venture Gear, Inc., Troy, MI (US)

( * ) Notice: Subject to any disclaimer, the term of this patent is extended or adjusted under 35 U.S.C. 154(b) by 20 days.

(21) Appl. No.: 10/032,362

(22) Filed: Dec. 21, 2001

(51) Int. Cl.[7] .................... F16H 37/08; B60K 17/344
(52) U.S. Cl. ................ 475/204; 475/199; 475/206; 475/219; 180/248
(58) Field of Search .................. 475/199, 198, 475/204, 205, 206, 218, 219; 180/248, 249

(56) References Cited

U.S. PATENT DOCUMENTS

| | | | |
|---|---|---|---|
| 5,443,429 A | | 8/1995 | Baxter, Jr. |
| 5,688,202 A | | 11/1997 | Bowen |
| 6,022,289 A | * | 2/2000 | Francis .................. 475/204 X |
| 6,113,512 A | * | 9/2000 | Williams .................... 475/204 |
| 6,152,848 A | * | 11/2000 | Williams et al. ............. 475/204 |
| 6,283,887 B1 | * | 9/2001 | Brown et al. ............... 475/204 |

FOREIGN PATENT DOCUMENTS

| | | | | |
|---|---|---|---|---|
| JP | 402120140 | * | 5/1990 | ................. 180/248 |
| JP | 405294155 | * | 11/1993 | ................. 180/248 |

* cited by examiner

*Primary Examiner*—Charles A Marmor
*Assistant Examiner*—Ha Ho
(74) *Attorney, Agent, or Firm*—Harness, Dickey & Pierce P.L.C.

(57) ABSTRACT

A three-speed transfer case for providing a direct drive connection between the input shaft and the output shafts, a low-range drive connection and an ultra low-range drive connection. The ability to choose between the distinct speed ratio drive connections permits the vehicle operator to best match the road conditions or off-road terrain to the tractive requirements of the motor vehicle.

21 Claims, 9 Drawing Sheets

| MODE | RANGE SLEEVE | LOCK-OUT SLEEVE | MODE SLEEVE |
|---|---|---|---|
| FULL-TIME HIGH-RANGE | H | X | A |
| LOCKED HIGH-RANGE | H | X | B |
| NEUTRAL | N | X | A or B |
| FULL-TIME LOW-RANGE | L | X | A |
| LOCKED LOW-RANGE | L | X | B |
| LOCKED ULTRA LOW-RANGE | L | Y | C |
| LOCKED MID-RANGE | H | Y | C |

*Figure - 9*

THREE-SPEED TRANSFER CASE

FIELD OF THE INVENTION

The present inventions generally to transfer cases for used in four-wheel drive motor vehicles and, more particularly, to a multi-speed transfer case.

BACKGROUND OF THE INVENTION

Due to growing consumer demand for four-wheel drive vehicles, a plethora of different power transfer systems are currently utilized for directing power (i.e., drive torque) to all four wheels of the vehicle. For example, in many "part-time" power transfer systems, a transfer case is installed between the front and rear drivelines and is normally operable in a two-wheel drive mode for delivering drive torque to the driven wheels. However, when the four-wheel drive mode is desired, a mode shift mechanism is selectively actuated by the vehicle operator for directly coupling the non-driven wheels to the driven wheels for establishing a part-time or locked four-wheel drive mode.

A significant number of the transfer cases discussed above are equipped with a gear reduction unit and a range shift mechanism operable for permitting the vehicle operator to choose between a high-range and a low-range drive mode. The particular low-range reduction ratio established is dictated by the gear geometry of the gear components associated with the reduction unit and, as such, all conventional two-speed transfer cases have a fixed ratio which ranges between about 2.5 to 4.5 to 1.0. True off-road enthusiasts desire the higher ratio which provides greater tractive ability over the most severe terrain. In contrast, the lower ratio is considered to provide the best tractive results for most typical road and severe weather conditions. Thus, the need exists to provide a multi-speed transfer case that can provide both a high and low reduction ratio mode in addition to the direct ratio mode.

SUMMARY OF THE INVENTION

It is an object of the present invention to provide a transfer case for use in four-wheel drive vehicles that is capable of establishing at least three distinct speed ratio drive connections between the input shaft and the output shafts.

As a related object, the transfer case is operable to establish a high-range direct drive connection, a low-range reduction ratio drive connection, and an ultra low-range reduction ratio drive connection.

As a further related object, the transfer case of the present invention is also operable to establish a mid-range drive connection.

As a further object, the three-speed transfer case of the present invention is operable to establish full-time and part-time four-wheel drive modes.

In accordance with a preferred embodiment of the present invention, the three-speed transfer case includes and input shaft, first and second output shafts, and a first planetary gearset having a first sun gear driven by the input shaft, a first ring gear fixed to a stationary member, and a set of first pinions meshed with the first sun gear and the first ring gear and which are rotatably supported from a first carrier. The transfer case further includes a second planetary gearset including a second sun gear, a third sun gear, a second ring gear, a second carrier driving the first output shaft, a set of second pinions rotatably supported by the second carrier and meshed with the second ring gear and the second sun gear, and a set of third pinions rotatably supported by the second carrier and meshed with the third sun gear and the second pinions. A transfer mechanism is provided for driving the second output shaft. The transfer case also includes a range clutch operable in a first state to couple the second ring gear to the input shaft and in a second state to couple the second ring gear to the first carrier; a lock-out clutch operable in a first state to permit rotation of the second sun gear and in a second state to couple the second sun gear to the stationary member; and a mode clutch operable in a first state to couple the transfer mechanism to the third sun gear, in a second state to couple the transfer mechanism to the third sun gear and the second carrier, and in a third state to couple the transfer mechanism to the second carrier.

These and other objects, features and advantages of the present invention will be clearly illustrated and understood upon study of the following written description when taken in conjunction with the following drawings.

BRIEF DESCRIPTION OF THE DRAWINGS

FIG. 9 is a chart listing the position of the various clutches used to establish each of the above-listed operational modes.

DETAILED DESCRIPTION OF THE PREFERRED EMBODIMENTS

Figure 1:
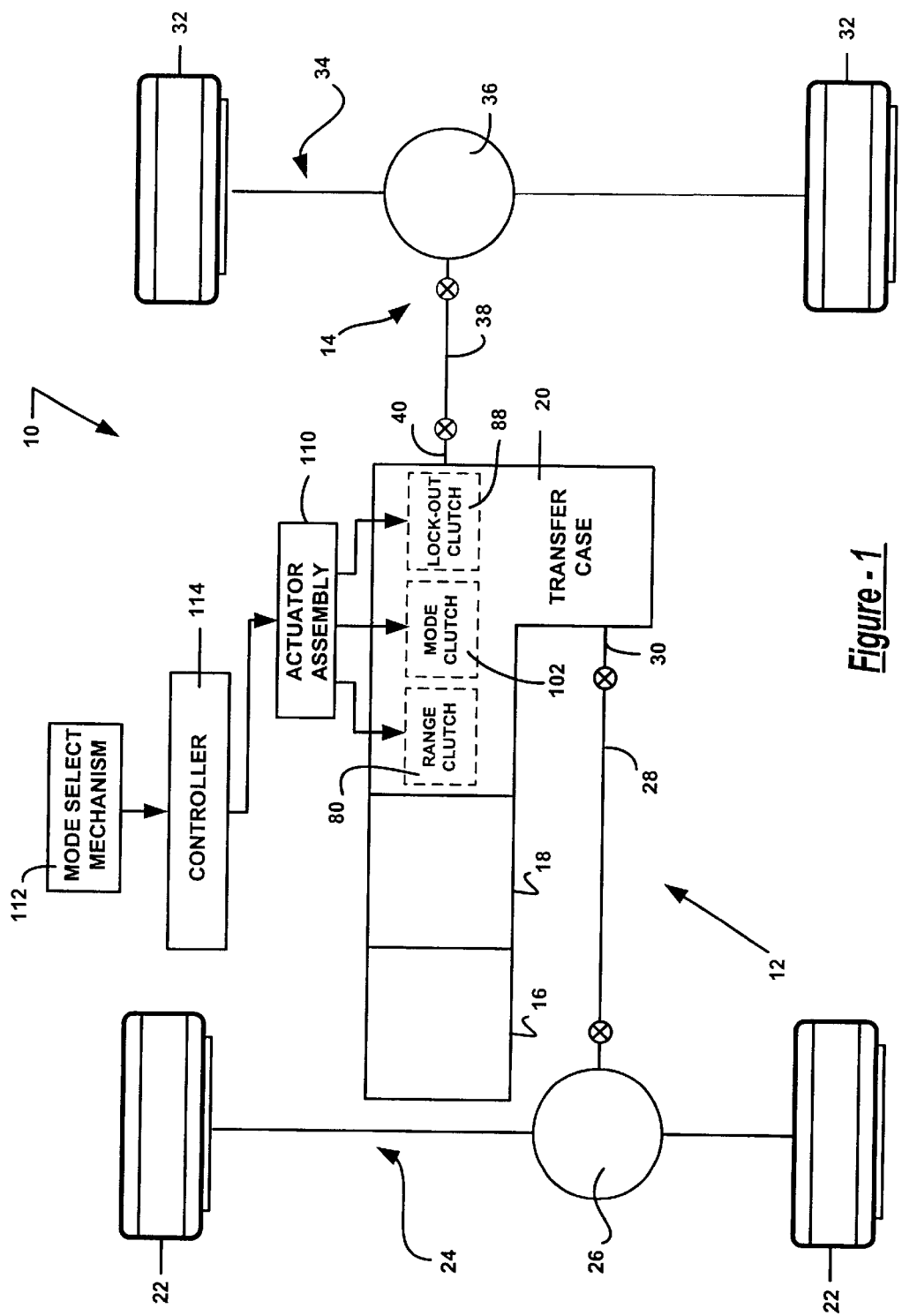
FIG. 1 is a schematic representation of a four-wheel drive vehicle equipped with a multi-speed transfer case according to the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both driveable from a source of power, such as an engine 16, through a transmission 18 which may be of the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

Transfer case 20 includes an input shaft 42 that is rotatably supported by a bearing assembly from housing 44 input shaft 42 is driven by the output of transmission 18. Rear output shaft 40 and front output shaft 30 are also rotatably supported from housing 44 by suitable bearing assemblies. A first planetary gearset 46 includes a first sun gear 48 driven by input shaft 42, a first ring gear 50 fixed to housing 44, and a set of first pinions 52 each meshed with first sun gear 48 and first ring gear 50. First pinion gears 52 are rotatably supported on pins extending between a first carrier ring 54 and a second carrier ring 56 which are interconnected to define a first carrier 58. Transfer case 20 further includes a second planetary gearset 60 having a second ring gear 62, a second sun gear 64, a third sun gear 66, a set of second pinions 68, and a set of third pinions 70. Second pinions 68 are rotatably supported on pins extending between a third carrier ring 72 and a fourth carrier ring 74 which are interconnected to define a second carrier 76. Second pinions 68 are meshed with second ring gear 62 and second sun gear 64. Third pinions 70 are rotatably supported on pins extending between fourth carrier ring 74 and a fifth carrier ring 78 such that they are also supported by second carrier 76. Third pinions 70 are meshed with third sun gear 66 and second pinions 68.

Transfer case 20 also includes a range clutch 80 that is operable for selectively coupling output components of first gearset 46 to an input component of second planetary gearset 60. In particular, second ring gear 62 includes a shaft segment 82 on which a range sleeve 84 is splined for sliding movement between three distinct range position. Range sleeve 84 is moveable between a high-range ("H") position, a neutral ("N") position and a low-range ("L") position. In the H position, clutch teeth on range sleeve 84 engage clutch teeth on first sun gear 48 such that a direct drive ratio (1:1) is established between input shaft 42 and second ring gear 62. In the L position, the clutch teeth on range sleeve 84 engage clutch teeth on second carrier ring 56 such that a first reduced ratio of approximately 2.72:1 is established between input shaft 42 and second ring gear 62. Specifically, since first ring gear 50 is braked against rotation, rotation of input shaft 42 causes first carrier 58 to be driven at a reduced speed dictated by the gear ratios of the components of first planetary gearset 46. The 2.72:1 ratio is established when first ring gear 50 has 91 teeth, first sun gear 48 has 53 teeth, and each first pinion 52 has 19 teeth. Finally, when range sleeve 84 is located in its N position, the drive connection between input shaft 42 and second ring gear 62 is interrupted.

As seen, second carrier 76 drives rear output shaft 40 via third carrier ring 72 being directly fixed thereto. Second sun gear 64 is shown to include an elongated shaft segment 86 that is journalled on rear output shaft 40. Transfer case 20 also includes a lock-out clutch 88 that is operable for selectively coupling second sun gear 64 to housing 44. In particular, lock-out clutch 88 includes a brake plate 90 fixed to housing 44 and a lock-out sleeve 92 that is splined for sliding movement on shaft segment 86 between a first position ("X") and a second position ("Y"). In the X position, clutch teeth on lock-out sleeve 92 are released from engagement with clutch teeth on brake plate 90 such that second sun gear 64 is free to rotate relative to housing 44. In contrast, movement of lock-out sleeve 92 to its Y position results: in engagement of its clutch teeth with the clutch teeth on brake plate 90 so as to prevent rotation of second sun gear 64.

Transfer case 20 is further shown to include a transfer mechanism 94 including a drive sprocket 96 journalled on shaft segment 86 of second sun gear 64, a driven sprocket 98 fixed to first output shaft 30, and a power chain 100 interconnecting driven sprocket 98 to drive sprocket 96. A mode clutch 102 is operable for selectively coupling drive sprocket 96 to at least one of third sun gear 66 and second carrier 76. Mode clutch 102 includes a mode sleeve 104 that is splined to drive sprocket 96 for sliding movement between three distinct mode positions. Mode sleeve 104 is moveable between a first mode position ("A"), a second mode position ("B"), and a third mode position ("C"). When mode sleeve 104 is in its A position, its clutch teeth mesh with clutch teeth formed on a clutch ring segment 106 of third sun gear 66 such that third sun gear 66 is connected to transfer mechanism 94 for transferring drive torque to front output shaft 30. When mode sleeve 104 is in its B position, its clutch teeth are maintained in meshed engagement with the clutch teeth on clutch ring segment 106 of third sun gear 66 and further engage clutch teeth on a clutch ring segment 108 fixed to fourth carrier ring 74, whereby both second carrier 76 and third sun gear 66 are coupled to transfer mechanism 94. Finally, movement of mode sleeve 104 to its C position causes its clutch teeth to be released from engagement with the clutch teeth on clutch ring segment 106 of third sun gear 66 while maintaining engagement with the clutch teeth on clutch ring segment 108 driven by second carrier 76. In this position, mode sleeve 104 only couples second carrier 76 to transfer mechanism 94.

Power transfer system 10 is shown to include a power-operated actuator assembly 110 for controlling movement of range sleeve 84, lock-out sleeve 92, and mode sleeve 104 to establish at least seven different operational modes. Power transfer system 10 also includes a mode selector mechanism 112 for permitting the vehicle operator to select a desired operational mode, and a control unit 114 which functions to control activation of actuator assembly 110 in response to the particular mode signal sent thereto by mode select mechanism 112. Preferably, actuator assembly 110 includes a rotary actuator, such as an electric gearmotor 116 which rotates a drive mechanism capable of coordinating movement of the three sleeves to establish a selected operational mode. The drive mechanism is interconnected to an output member 118 of gearmotor 116 and includes a sector plate 120 that is rotatably driven through a range of angular motion by output member 118 in response to activation of electric gearmotor 116.

To generate axial movement of range sleeve 84, sector plate 120 includes a first slot 122 within which a follower 124 is retained that is fixed to a first fork 126. Fork 126 is also connected to range sleeve 84. The contour of first slot 122 is adapted to control movement of range sleeve 84 between its H, N and L range positions in response to bi-directional rotation of sector plate 120. Likewise, sector plate 120 also includes a second slot 130 within which a follower 132 is retained that is fixed to a second fork 134. Second fork 134 is also connected to lock-out sleeve 92. The contour of second slot 130 is adapted to control movement of lock-out sleeve 92 between its X and Y positions in response to bidirectional rotation of sector plate 120. Finally, sector plate 120 includes a third slot 136 within which a follower 138 is retained that is fixed to a third fork 140. Third fork 140 is also connected to mode sleeve 104. The contour of third slot 136 is adapted to control movement of mode sleeve 104 between its A, B and C positions in response to bi-directional rotation of sector plate 120. With this arrangement, a single power-operated device is capable of coordinating movement of the various sleeves to establish the six different operational modes. As an alternative, first slot 122 and slot 130 could be profiled end surfaces of sector plate 120 with their corresponding followers 124 and 132 biased by springs in continuous contact therewith. It is also possible to utilize separate electric actuators, similar to gearmotor 116, for controlling independent movement of first fork 126, second fork 134 and third fork 140.

According to one embodiment of the present invention, sector plate 120 may be rotated to any one of seven distinct sector positions to establish a corresponding number of operational modes. These modes include a full-time four-wheel high-range drive mode, a locked or part-time four-wheel high-range drive mode, a neutral mode, a full-time four-wheel low-range drive mode, a part-time four-wheel low-range drive mode, a part-time four-wheel ultra low-range drive mode, and a part-time four-wheel mid-range drive mode. The particular four-wheel drive mode selected is established by the position of first pin 124 in first slot 122, the position of second pin 132 in second slot 130, and the position of third pin 138 in third slot 136. In operation, the vehicle operator selects a desired operational mode via actuation of mode select mechanism 112 which, in turn, sends a mode signal to controller 114 that is indicative of the selection. Thereafter, controller 114 generates an electric control signal that is applied to gearmotor 116 for controlling the rotated position of sector plate 120. It should be understood that transfer case 20 can be arranged to provide any number of the seven different drive. modes to provide a multi-speed power transfer device.

Mode select mechanism 112 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 112 offers the vehicle operator the option of deliberately choosing between the various operative drive modes.

Figure 2:
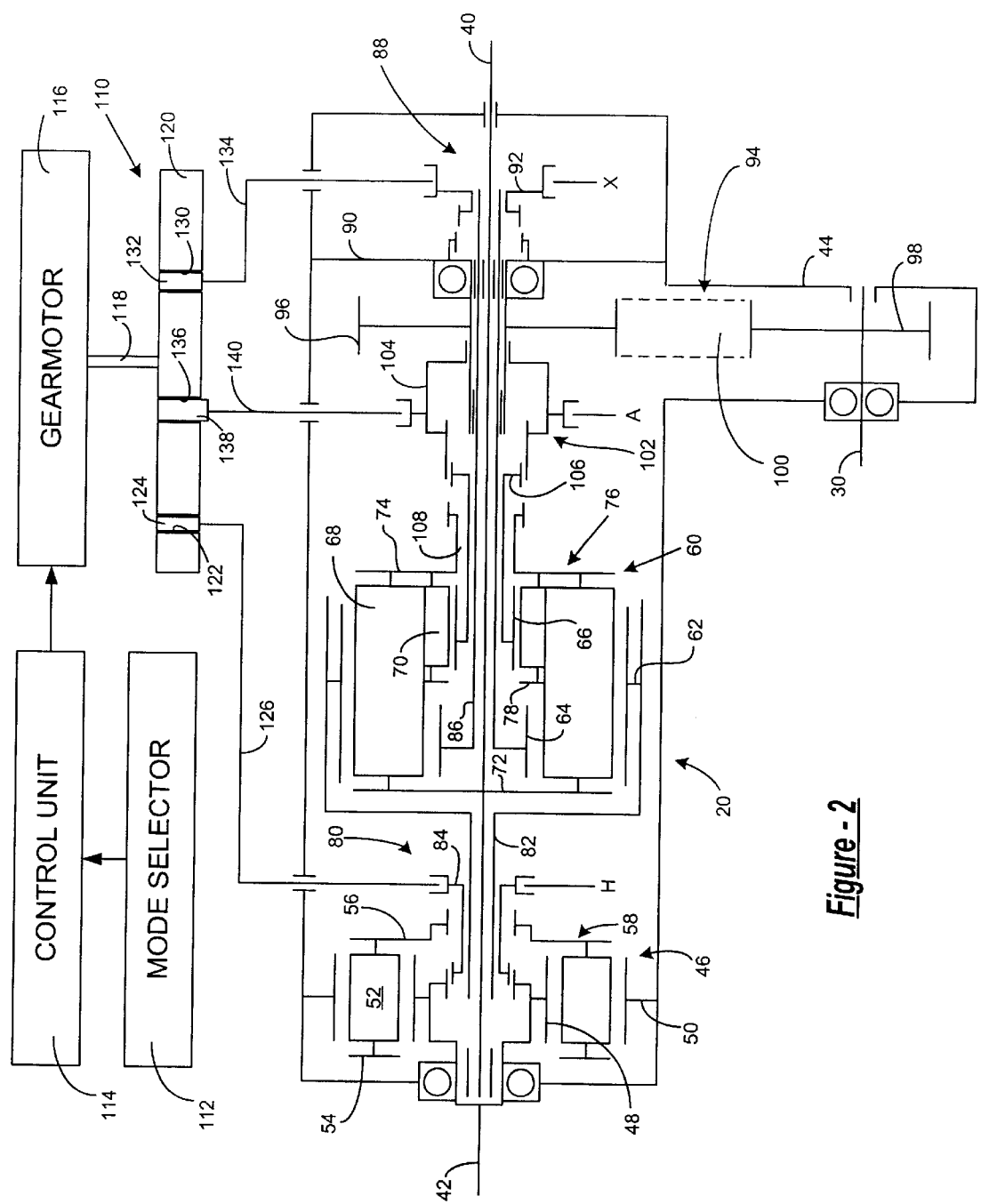
FIG. 2 is a schematic view of the multi-speed transfer case operating in a full-time high-range four-wheel drive mode.

When the full-time four-wheel high-range drive mode is selected, sector plate 120 is rotated to a first sector position causing range sleeve 84 to be located in its H position, lock-out sleeve 92 to be located in its X position, and mode sleeve 104 to be located in its A position, as best shown in FIG. 2. This mode does not provide any speed reduction between input shaft 42 and second ring gear 62 but does provide a torque split between rear output shaft 40 (via second carrier 76) and front output shaft 30 (via third sun gear 66 and transfer mechanism 94). Thus, the full-time four-wheel drive mode is established with speed differentiation permitted between the output shafts. In addition, second sun gear 64 is disconnected from the power flow paths and does not carry any loading.

Figure 3:
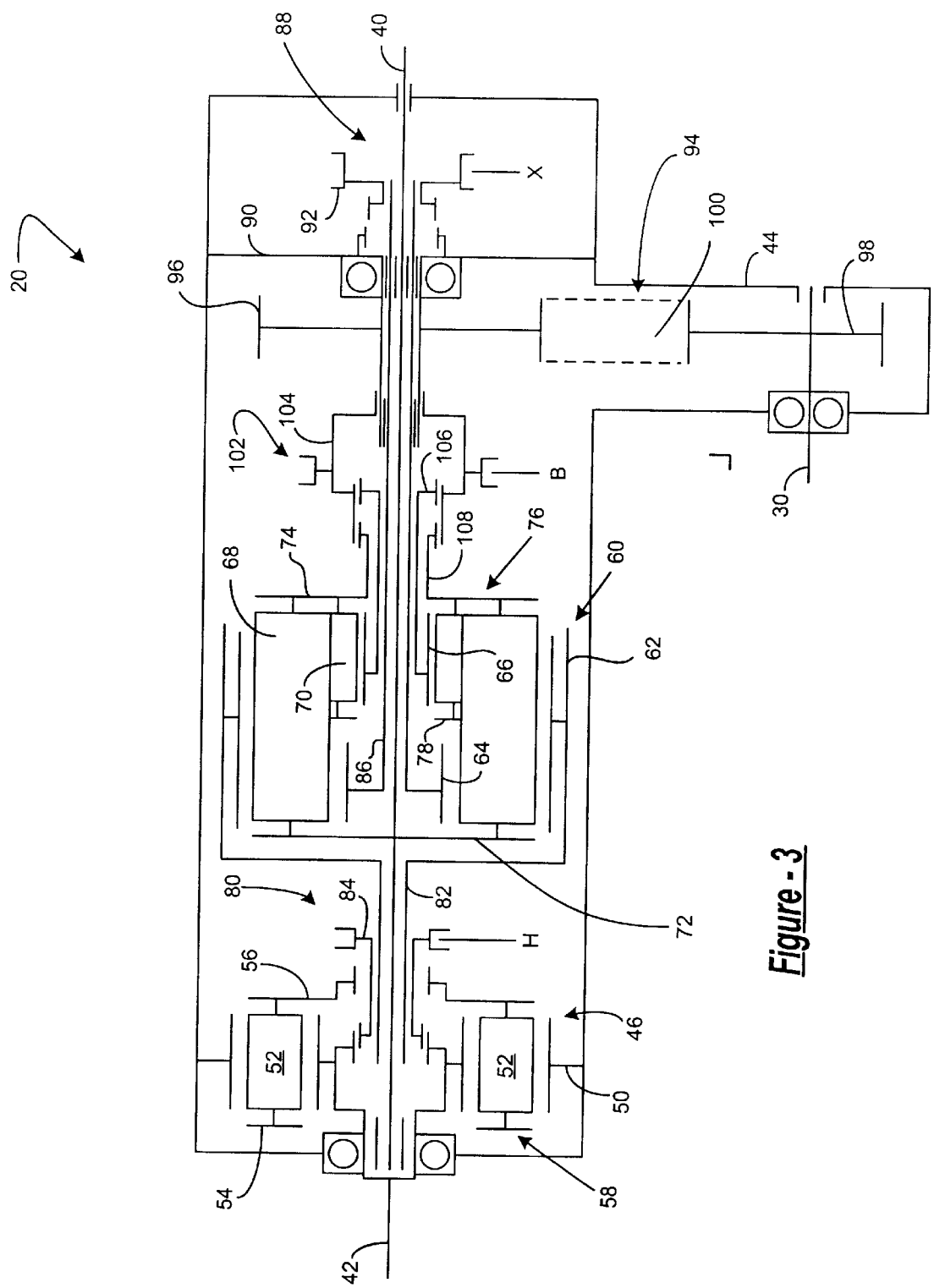
FIG. 3 is a schematic view, similar to FIG. 2, showing the multi-speed transfer case operating in a locked high-range four-wheel drive mode.

If mode selector 112 signals selection of the part-time four-wheel high-range drive mode, gearmotor 116 is activated to rotate sector plate 120 to a second sector position for locating range sleeve 84 in its H position, locating lock-out sleeve 92 in its X position, and locating mode sleeve 104 in its B position. This drive mode is shown in FIG. 3. With mode sleeve 104 in its B position, second carrier 76 and third sun gear 66 are directly coupled for common rotation such that no speed differentiation is permitted between rear output shaft 40 and first output shaft 30.

Figure 4:
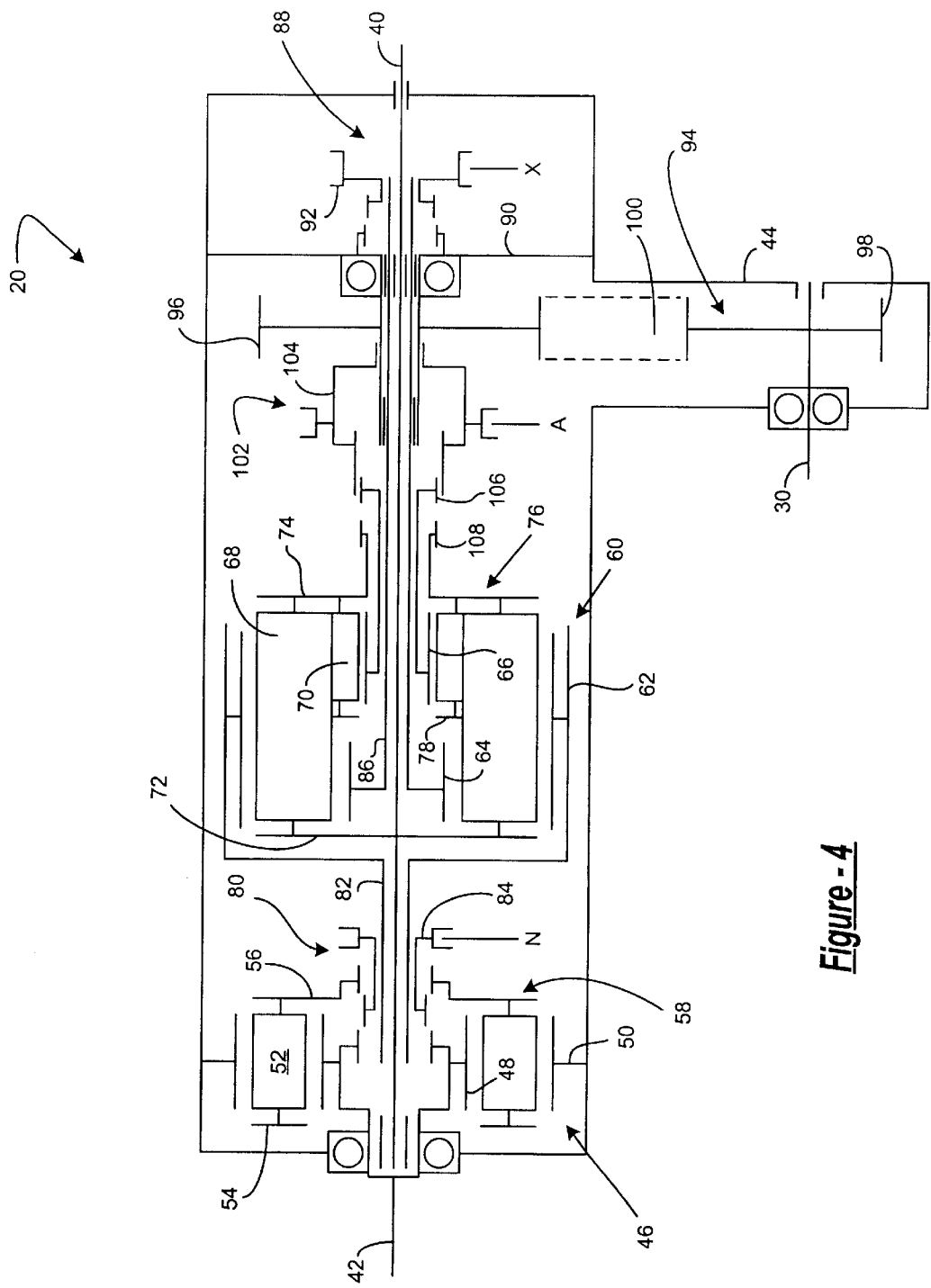
FIG. 4 shows the multi-speed transfer case operating in a neutral mode.

Referring to FIG. 4, transfer case 20 can also be shifted into a neutral mode for purposes of towing. When mode selector 112 indicates selection of this mode, gearmotor 116 rotates sector plate 120 to a third sector position. In particular, movement of sector plate 120 to its third sector position causes range sleeve 84 to be located in its N position, mode sleeve 104 to be located its A position, and lock-out sleeve 92 to be located in its X position. As such, no drive torque is transmitted from input shaft 42 through first gearset 46 to second gearset 60.

Figure 5:
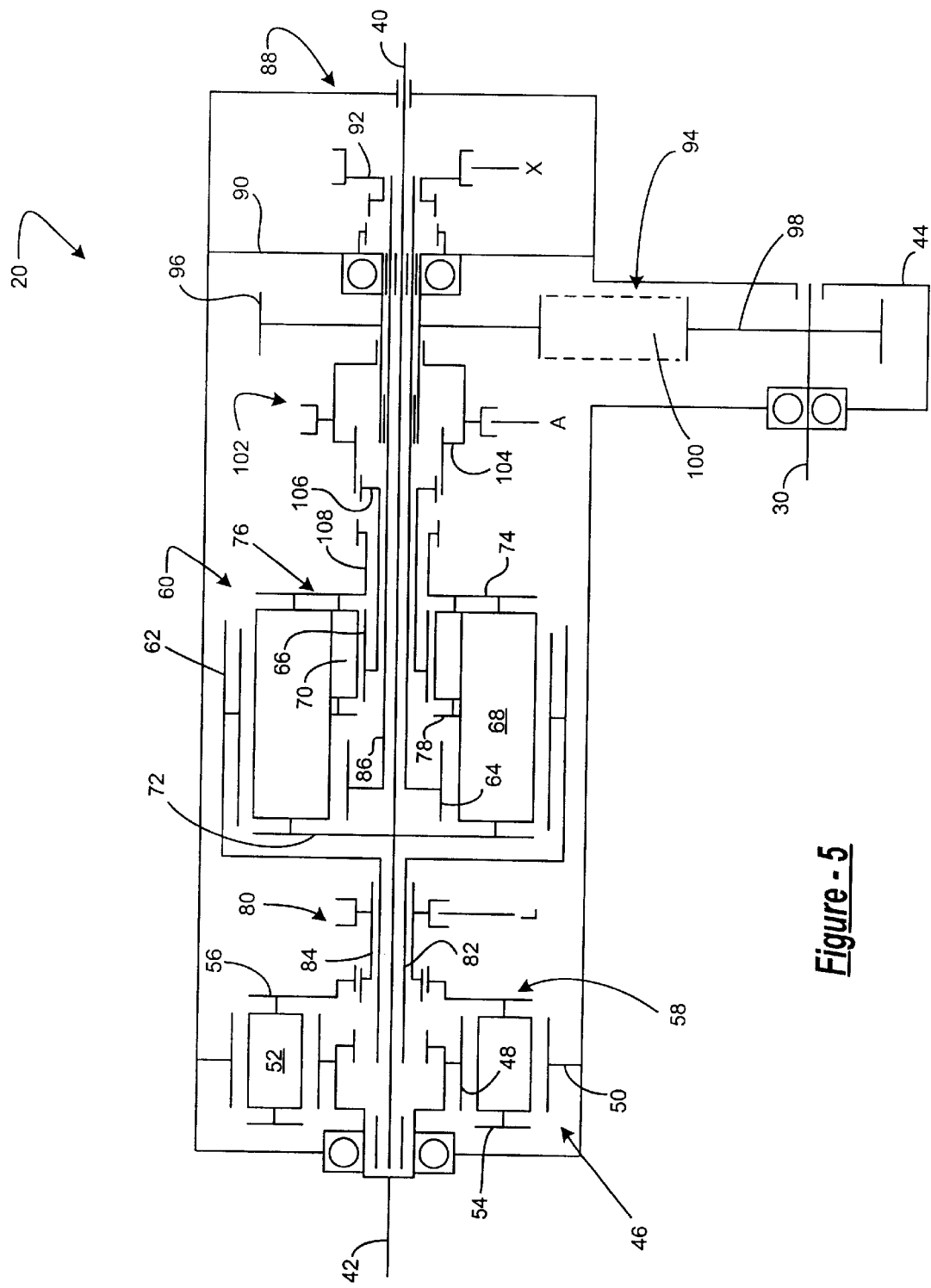
FIG. 5 shows the multi-speed transfer case operating in a full-time low-range four-wheel drive mode.

Selection of the full-time four-wheel low-range drive mode results in rotation of sector plate 120 to a fourth sector position whereat range sleeve 84 is located in its L position, lock-out sleeve 92 is located in its X position, and mode sleeve 104 is located in its A position. This mode for transfer case 20 is shown in FIG. 5 of the drawings. In particular, second ring gear 62 is driven at the reduced ratio of about 2.72:1 relative to input shaft 42 due to range sleeve 84 coupling ring gear 62 to first carrier 58. With mode sleeve 104 in its A position, third sun gear 66 is coupled to front output shaft 30 via transfer mechanism 94 while rear output shaft 40 is driven by second carrier 76. Thus, speed differentiation between the output shafts is permitted and the full-time four-wheel drive mode is established.

Figure 6:
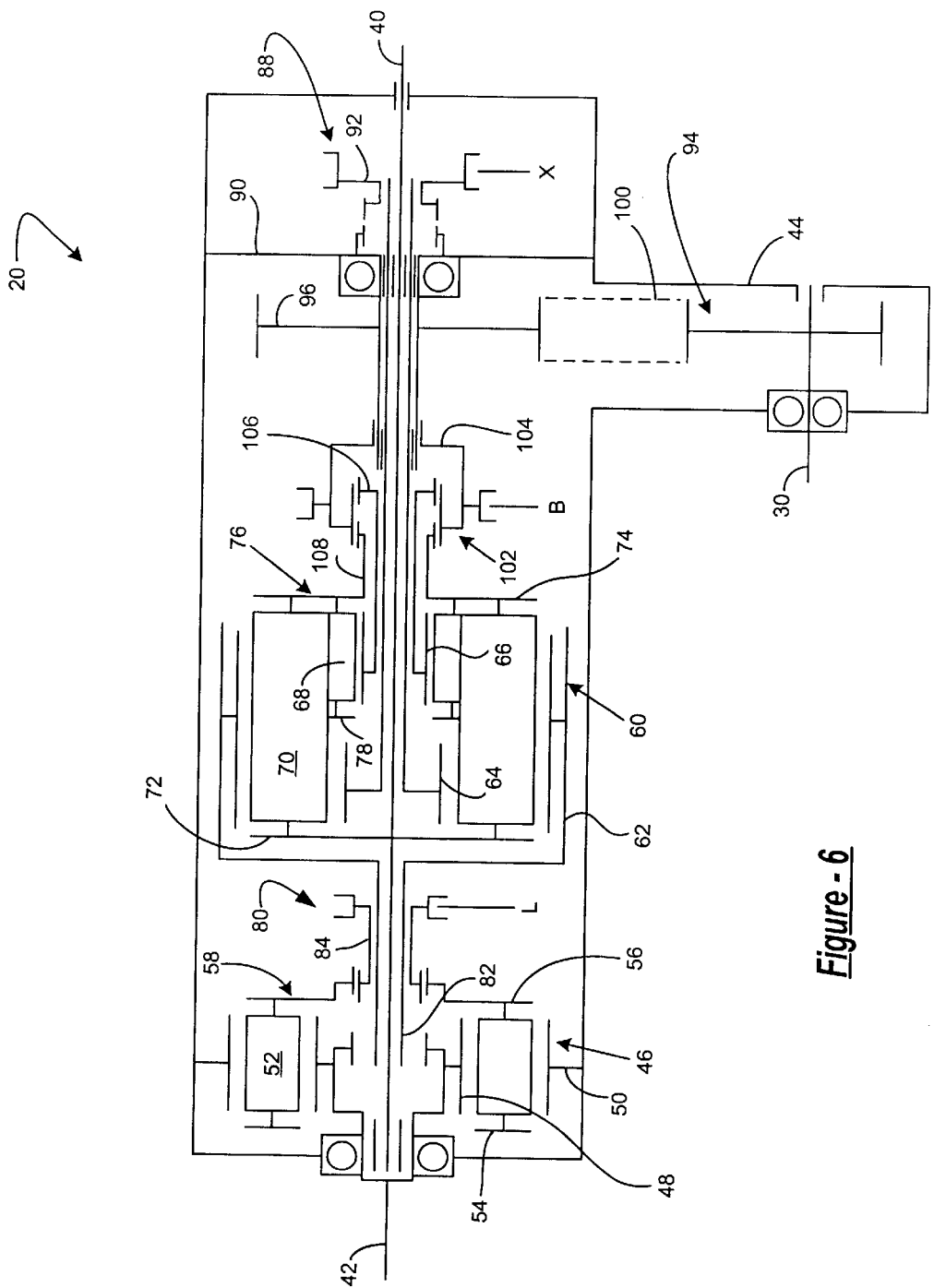
FIG. 6 shows the multi-speed transfer case operating in a locked low-range four-wheel drive mode.

Referring to FIG. 6, transfer case 20 is now shown operating in its part-time four-wheel low-range drive mode that is established when sector plate 120 is rotated to a fifth sector position. In this sector position, range sleeve 84 is located in its L position, mode sleeve 104 is located in its B position, and lock-out sleeve 92 is located in its X position. Thus, the low-range drive connection between input shaft 42 and second ring gear 62 is established while mode sleeve 104 couples third sun gear 66 to second carrier 76 so as to prevent speed differentiation between rear output shaft 40 and front output shaft 30 and establish the part-time four-wheel drive mode.

Figure 7:
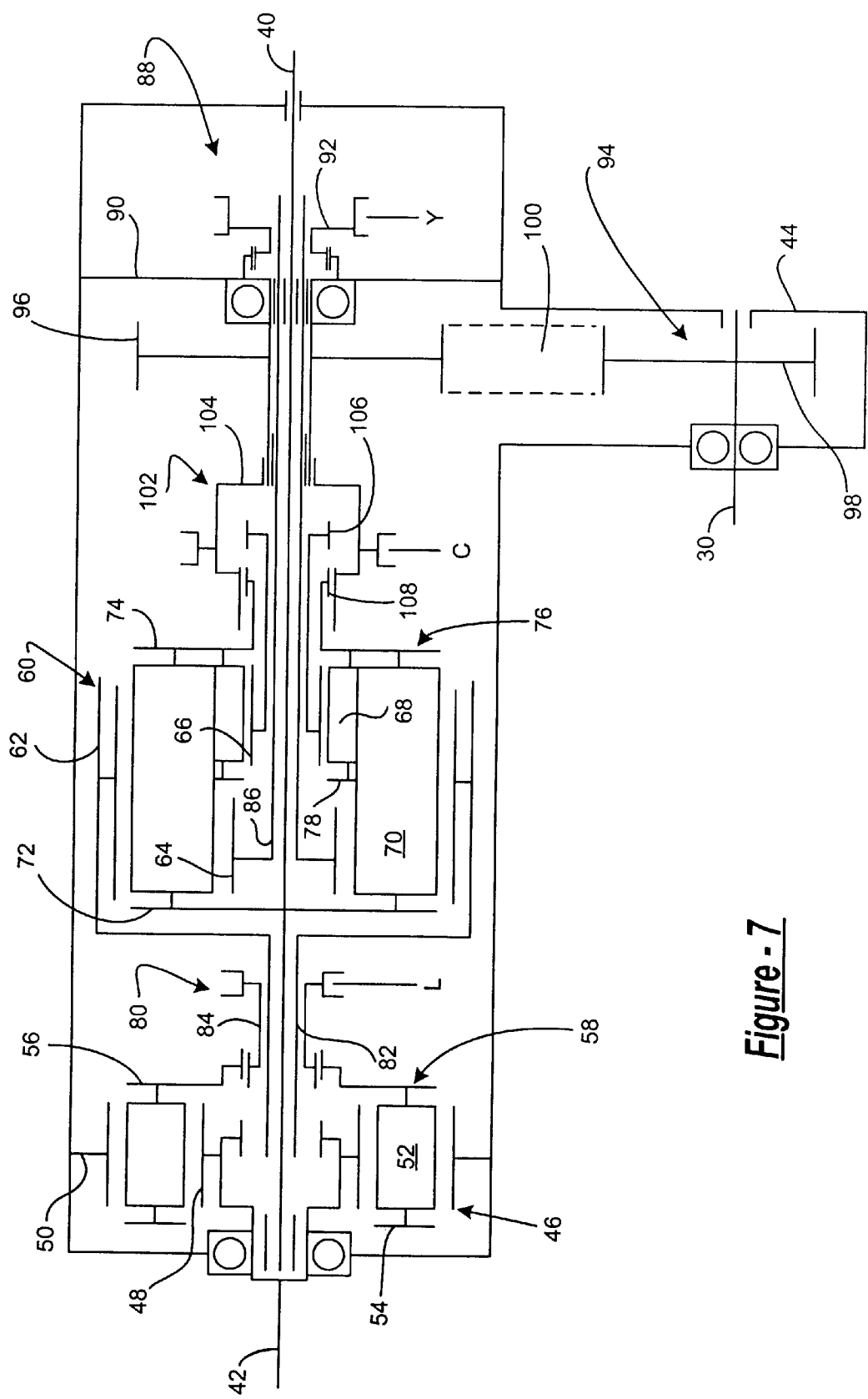
FIG. 7 shows the multi-speed transfer case operating in a locked ultra low-range four-wheel drive mode.

Another operational mode, referred to as the part-time four-wheel ultra low-range drive mode is shown in FIG. 7 with range sleeve 84 located in its L position, mode sleeve 104 in its C position, and lock-out sleeve 92 in its Y position. This location of the sleeves is a result of sector plate 120 being rotated to a sixth sector position from its fifth sector position. As such, the 2.72:1 ratio established across first planetary gearset 46 is compounded by an approximately 1.68:1 ratio that is established through second planetary gearset 60, thereby establishing an overall gear ratio reduction of about 4.57:1 between input shaft 42 and second carrier 76. The overall reduction ratio of about 4.57:1 establishes the ultra low-range and permits aggressive off-road driving. In this. mode, second carrier 76 drives both rear output shaft 40 (via third carrier ring 72) and front output shaft 30 (via fourth carrier ring 74, mode sleeve 104 and transfer mechanism 94) so as to establish the part-time four-wheel drive mode. As seen, with mode sleeve 104 in its C position, third sun gear 66 is disconnected from the power path and clutch plate segment 108 of carrier ring 74 is coupled to drive sprocket 96. Also, lock-out sleeve 92 acts to couple second sun gear 64 to brake plate 90 such that second sun gear 64 is fixed against rotation. Since second sun gear 64 is stationary, driven rotation of second ring gear 62 causes second carrier 76 to rotate at the reduced speed relative thereto, thereby establishing the second speed reduction ratio of about 1.64:1. To establish this particular ratio across second planetary gearset 60, second ring gear 62 has 87 teeth, second sun geatr 64 has 59 teeth, third sun gear 66 has 34 teeth, second pinions 68 each have 14 teeth, and third pinions 70 each have 19 teeth. Thus, transfer case 20 provides several distinct speed ranges which can be selected to accommodate the particular road conditions and/or off-road terrain that the vehicle encounters.

Figure 8:
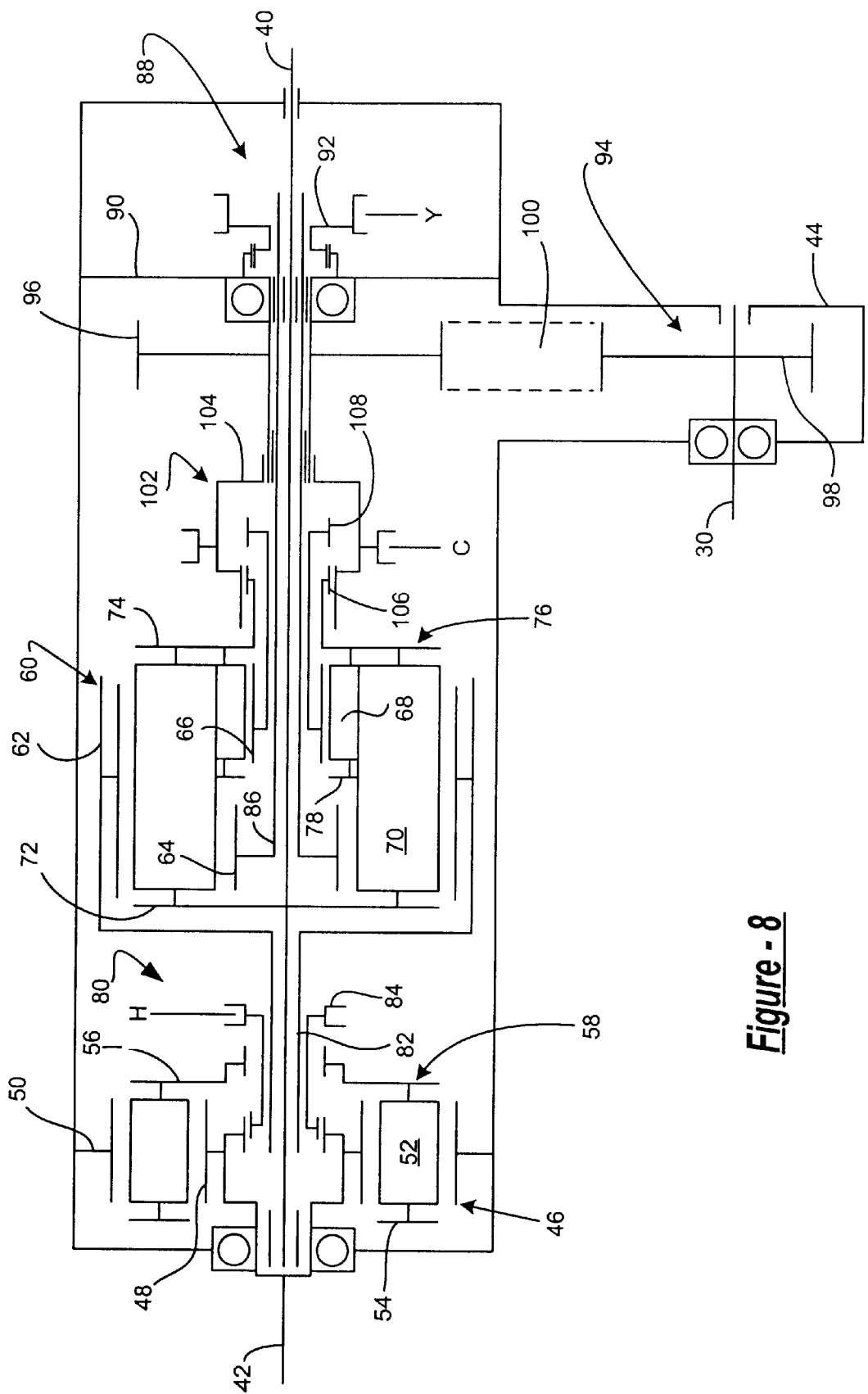
FIG. 8 shows the multi-speed transfer case operating in a locked mid-range four-wheel drive mode.

As a further option, transfer case 20 is operable, if so desired, to provide a fourth speed range in addition to the previously described high-range, low-range and ultra-low range. Specifically, a part-time four-wheel mid-range drive mode can be established when sector plate 120 is rotated from its sixth sector position to a seventh sector position. In this sector position, as shown in FIG. 8, range sleeve 84 is located in its H position, mode sleeve 104 is located in its C position, and lock-out sleeve 92 is located in its Y position. As such, the 1:1 ratio established by first planetary gearset 46 is compounded by the 1:68:1 ratio established across second planetary gearset 60, thereby establishing the 1.68:1 ratio between input shaft 42 and second carrier 76. This mid-range speed ratio between the 1:1 high-range and the 2.72:1 low-range can be mode available when road-terrain conditions warrant its use.

It will be appreciated that the first and second reduction ratios, and thus the compounded ratio, are merely exemplary and are dictated by the number of teeth provided on each gear component. Those skilled in the gear art will appreciate that alternative reduction ratios can be established utilizing the arrangement of gear components described in association with the present invention. Preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the-scope of the following claims.

What is claimed is:

1. A transfer case comprising:
   an input shaft;
   first and second output shafts;
   a first planetary gearset having a first sun gear driven by said input shaft, a first ring gear fixed to a stationary member, and a set of first pinions meshed with said first sun gear and said first ring gear which are rotatably supported from a first carrier;
   a second planetary gearset including a second sun gear, a third sun gear, a second ring gear, a second carrier driving said first output shaft, a set of second pinions rotatably supported by said second carrier and meshed with said second ring gear and said second sun gear, and a set of third pinions rotatably supported by said second carrier and meshed with said third sun gear and said second pinions;
   a transfer mechanism driving said second output shaft;
   a range clutch operable in a first state to couple said second ring gear to said input shaft and in a second state to couple said second ring gear to said first carrier;
   a lock-out clutch operable in a first state to permit rotation of said second sun gear and in a second state to couple said second sun gear to said stationary member; and
   a mode clutch operable in a first state to couple said transfer mechanism to said third sun gear, in a second state to couple said transfer mechanism to said third sun gear and said second carrier, and in a third state to couple said transfer mechanism to said second carrier.

2. The transfer case of claim 1 adapted to establish three distinct speed ratio drive connections between said input shaft and at least one of said first and second output shafts, wherein a direct drive connection is established with said range clutch in its first state, said lock-out clutch in its first state and said mode clutch in its second state, wherein a first reduction ratio drive connection is established with said range clutch in its second state, said lock-out clutch in its first state and said mode clutch in its second state, and wherein a second reduction ratio drive connection is established with said range clutch in its second state, said lock-out clutch in its second state and said mode clutch in its third state.

3. The transfer case of claim 2 wherein each of said three speed ratio drive connections further defines a part-time four-wheel drive mode with said second carrier driving said first output shaft directly and further driving said second output shaft through said transfer mechanism.

4. The transfer case of claim 1 wherein said range clutch includes a range sleeve operable in a first position to couple said second ring gear to said input shaft and further operable in a second position to couple said second ring gear to said first carrier, wherein said lock-out clutch includes a lock-out sleeve operable in a first position to release said second sun gear from coupled engagement with said stationary member and further operable in a second position to couple said second sun gear to said stationary member, and wherein said mode clutch includes a mode sleeve operable in a first position to couple said transfer mechanism to said third sun gear, in a second position to couple said transfer mechanism to both said third sun gear and said second carrier, and in a third position to couple said transfer mechanism to said second carrier.

5. The transfer case of claim 4 further comprising a shift system for controlling movement of said range sleeve, said lock-out sleeve and said mode sleeve.

6. The transfer case of claim 5 wherein said shift system is operable for establishing a full-time four-wheel high-range drive mode when said range sleeve is in its first position, said lock-out sleeve is in its first position, and said mode sleeve is in its first position.

7. The transfer case of claim 5 wherein said shift system enables establishment of a part-time four-wheel high-range drive mode when said range sleeve is in its first position, said lock-out sleeve is in its first position, and said mode sleeve is in its second position.

8. The transfer case of claim 5 wherein said shift system enables establishment of a full-time four-wheel low-range drive mode when said range sleeve is in its second position, said lock-out sleeve is in its first position, and said mode sleeve is in its first position.

9. The transfer case of claim 5 wherein said shift system enables establishment of a part-time four-wheel low-range drive mode when said range sleeve is in its second position, said lock-out sleeve is in its first position, and said mode sleeve is in its second position.

10. The transfer case of claim 5 wherein said shift system enables establishment of a part-time four-wheel ultra low-range drive mode when said range sleeve is in its second position, said lock-out sleeve is in its second position, and said mode sleeve is in its third position.

11. The transfer case of claim 5 wherein said shift system includes:
    a drive mechanism interconnected to each of said range sleeve, said lock-out sleeve,and said mode sleeve;
    a power-operator actuator for moving said drive mechanism;
    a controller for controlling actuation of said actuator; and:
    a mode selector permitting selection of a desired operational mode and sending a corresponding mode signal to said controller, said controller operable to send a control signal to said actuator in response to said mode signal.

12. A transfer case comprising:

an input shaft;

front and rear output shafts;

a first planetary gearset having a first sun gear driven by said input shaft, a first ring gear fixed to a stationary member, and a set of first pinions meshed with said first sun gear and said first ring gear which are rotatably supported from a first carrier;

a second planetary gearset including a second sun gear, a third sun gear, a second ring gear, a second carrier driving said rear output shaft, a set of second pinions rotatably supported by said second carrier and meshed with said second ring gear and said second sun gear, and a set of third pinions rotatably supported by said second carrier and meshed with said third sun gear and said second pinions;

a transfer mechanism driving said front output shaft;

a range sleeve operable in a first position to couple said second ring gear to said input shaft and in a second position to couple said second ring gear to said first carrier;

a lock-out sleeve operable in a first position to permit rotation of said second sun gear and in a second position to couple said second sun gear to said stationary member; and a mode sleeve operable in a first position to couple said transfer mechanism to said third sun gear, in a second position to couple said transfer mechanism to said third sun gear and said second carrier, and in a third position to couple said transfer mechanism to said second carrier.

13. The transfer case of claim 12 adapted to establish three distinct speed ratio drive connections between said input shaft and at least one of said front and rear output shafts, wherein a direct drive connection is established with said range sleeve in its first position, said lock-out sleeve in its first position and said mode sleeve in its second position, wherein a first reduction ratio drive connection is established with said range sleeve in its second position, said lockout sleeve in its first position and said mode sleeve in its second position, and wherein a second reduction ratio drive connection is established with said range sleeve in its second position, said lock-out sleeve in its second position and said mode sleeve in its third position.

14. The transfer case of claim 13 wherein each of said three speed ratio drive connections further defines a part-time four-wheel drive mode with said second carrier driving said rear output shaft directly and said second carrier driving said front output shaft through said transfer mechanism.

15. The transfer case of claim 14 further comprising a shift system for controlling movement of said range sleeve, said lock-out sleeve, and said mode sleeve.

16. The transfer case of claim 15 wherein said shift system is operable for establishing a full-time four-wheel high-range drive mode when said range sleeve is in its first position, said lock-out sleeve is in its first position, and said mode sleeve is in its first position.

17. The transfer case of claim 15 wherein said shift system enables establishment of a part-time four-wheel high-range drive mode when said range sleeve is in its first position, said lock-out sleeve is in its first position, and said mode sleeve is in its second position.

18. The transfer case-of claim 15 wherein said shift system enables establishment of a full-time four-wheel low-range drive mode when said range sleeve is in its second position, said lock-out sleeve is in its first position, and said mode sleeve is in its first position.

19. The transfer case of claim 15 wherein said shift system enables establishment of a part-time four-wheel low-range drive mode when said range sleeve is in its second position, said lock-out sleeve is in its first position, and said mode sleeve is in its second position.

20. The transfer case of claim 15 wherein said shift system enables establishment of a part-time four-wheel-ultra low-range drive mode when said range sleeve is in its second position, said lock-out sleeve is in its second position, and said mode sleeve is in its third position.

21. The transfer case of claim 15 wherein said shift system includes:

a drive mechanism interconnected to each of said range sleeve, said lock-out sleeve, and said mode sleeve;

a power-operated actuator for moving said drive mechanism;

a controller for controlling actuation of said actuator; and a mode selector permitting selection of a desired operational mode and sending a corresponding mode signal to said controller, said controller operable to send a control signal to said actuator in response to said mode signal.

* * * * *